United States Patent
Beyssac et al.

(10) Patent No.: US 7,134,666 B2
(45) Date of Patent: Nov. 14, 2006

(54) SUPPORT FOR STORING, TRANSPORTING AND USING DEVICES APPLYING A SEALING COMPOUND AND USES THEREOF

(75) Inventors: Georges Beyssac, Boulogne Billancourt (FR); Jacky Decreuse, Le Plessis Bouchard (FR)

(73) Assignee: Le Joint Francais, Paris (FR)

( * ) Notice: Subject to any disclaimer, the term of this patent is extended or adjusted under 35 U.S.C. 154(b) by 334 days.

(21) Appl. No.: 10/149,122

(22) PCT Filed: Dec. 8, 2000

(86) PCT No.: PCT/FR00/03453

§ 371 (c)(1),
(2), (4) Date: Oct. 15, 2002

(87) PCT Pub. No.: WO01/42689

PCT Pub. Date: Jun. 14, 2001

(65) Prior Publication Data

US 2003/0098546 A1    May 29, 2003

(30) Foreign Application Priority Data

Dec. 9, 1999    (FR) .................................. 99 15566

(51) Int. Cl.
*E04B 1/682* (2006.01)
*F16B 37/14* (2006.01)
*B65D 71/00* (2006.01)

(52) U.S. Cl. ...................... 277/316; 277/650; 277/917; 411/372.5; 411/373; 411/377; 206/338; 206/469; 206/582

(58) Field of Classification Search ................ 277/316, 277/917, 650; 411/372.5, 372.6, 373, 377; 206/531, 532, 338, 582, 469

See application file for complete search history.

(56) References Cited

U.S. PATENT DOCUMENTS

| | | | | |
|---|---|---|---|---|
| 2,402,977 A | * | 7/1946 | Patrick et al. | 528/388 |
| 2,710,113 A | * | 6/1955 | Pritchard | 220/681 |
| 3,470,787 A | * | 10/1969 | Mackie | 411/377 |
| 3,707,226 A | * | 12/1972 | Wippermann | 206/490 |
| 4,316,690 A | * | 2/1982 | Voller | 411/377 |
| 4,518,081 A | * | 5/1985 | de Larosiere | 206/158 |
| 4,519,974 A | | 5/1985 | Bravenec et al. | |
| 4,826,380 A | * | 5/1989 | Henry | 411/377 |
| 4,923,348 A | | 5/1990 | Carlozzo et al. | |
| 4,925,030 A | * | 5/1990 | Ball | 206/487 |
| 5,286,040 A | * | 2/1994 | Gavin | 277/606 |
| 5,338,141 A | * | 8/1994 | Hulsey | 411/375 |
| 2003/0071421 A1 | * | 4/2003 | Obuhowich | 277/316 |

FOREIGN PATENT DOCUMENTS

DE    3046291 A1    7/1982

(Continued)

*Primary Examiner*—Alison K. Pickard
(74) *Attorney, Agent, or Firm*—Morgan Lewis & Bockius LLP

(57) ABSTRACT

The invention concerns a support (30) for storing, transporting and using devices (10) for applying a sealing compound onto an element projecting on a surface. The invention is characterised in that it comprises a plurality of said devices borne by a substantially planar base plate (32) and wherefrom the latter can be detached, and each device includes a cap (11) designed to cover entirely said element and containing a predetermined amount of sealing compound in frozen state. The invention is useful for producing impermeability to fluids at rigid connecting elements such as rivets, bolts or the like, for protecting projecting elements of structures against electromagnetic effects such as lightning.

16 Claims, 2 Drawing Sheets

| | FOREIGN PATENT DOCUMENTS | | GB | 2 163 817 A | 3/1986 |
|---|---|---|---|---|---|
| GB | 2 064 680 | 6/1981 | * cited by examiner | | |

SUPPORT FOR STORING, TRANSPORTING AND USING DEVICES APPLYING A SEALING COMPOUND AND USES THEREOF

The present invention relates to a support for storing, transporting and using devices for applying a mastic sealant to a protruding element on a surface, and to the uses of this support.

In the aeronautical industry, the sheet metal intended to form the walls of fluid-tight structures, such as the fuel tanks or the fuselage, is very widely assembled by means of rigid linking elements, of the rivet, bolt or similar type, which pass right through the thickness of the metal sheets that they assemble.

Despite accomplished fitting efforts to reduce the residual spaces likely to exist between the various parts of these linking elements and between the latter and the walls of the holes in which they are held, there always persists a risk of fluid leakage threat.

To eliminate this risk, a seal is formed by applying, to that portion of the linking elements which protrudes from the surface of the metal sheet intended to be in contact with the fluid or fluids and to that portion of the metal sheet adjacent to these elements, a semiliquid or pasty mastic capable of forming, after curing in the ambient air, a fluid-resistant and impermeable barrier.

It is the usual practice to apply a mastic, for the purpose of forming a seal at the linking elements, and to that sheet metal portion lying around these linking elements, manually using a brush. Thus, taking into account the very large number of linking elements used in aeronautical construction, the formation of a seal at these elements therefore consumes a great deal of time. It also consumes a large amount of mastic, insofar as the workers responsible for making this seal have a tendency, for security, to apply larger amounts of mastic than those actually needed to obtain a satisfactory seal. However, apart from the financial overcost that this represents, any excess material translates to an unnecessary weight burden, whereas the aeronautical industry is constantly seeking to minimize the weight of aircraft. Finally, such application using a brush does not make it possible to ensure that the mastic is deposited uniformly, especially from one linking element to another, suitable for guaranteeing a constant quality of the seal thus formed.

Consequently, it has been proposed, in British patent application No. 2 163 817, to employ ready-to-use devices which are in the form of a bell-shaped receptacle prefilled with a predetermined amount of a mastic, these devices being frozen, for storing them, and then defrosted for using them. Thus, to apply a mastic sealant by means of these devices, all that is required is to allow them to defrost, by letting them stand, for example, at room temperature for a few minutes, so that the mastic recovers its properties, and especially the consistency of a fresh mastic, and then to apply said devices to the elements that it is desired to coat with mastic.

To manufacture such devices and then fill them with a predetermined amount of mastic often proves to be not very practical and time-consuming, especially if it is desired to produce them in high volume. To transport and store these devices in loose form is also relatively expensive, insofar as the volume occupied by the devices is not optimized, and not easy to implement, owing to the risk of the mastic escaping from the devices should they be inadvertently defrozen. Finally, when used, they are not simple to handle and it may quite quickly prove to be prejudicial to the required profitability owing to the considerable number of similar devices that it is necessary in general to install on an airplane cabin.

The object of the invention is in particular to provide a solution to these problems.

For this purpose, the invention relates to a support for storing, transporting and using devices for applying a mastic sealant to a protruding element on a surface, this support being characterized in that it comprises a plurality of these devices borne by a substantially plane base, said devices being detachable therefrom, and in that each device includes a capsule which is intended to completely cover said element and contains a predetermined amount of said mastic in the frozen state.

According to an advantageous embodiment of the invention, the devices for applying a mastic sealant and the base which bears them form a one-piece structure.

According to a preferred version of this embodiment, the capsules of the devices for applying a mastic sealant and the base are made of the same material and are linked by bridges of this material which are capable of being broken by pressing manually or by using any suitable tool.

According to a preferred embodiment of the support according to the invention, this support is obtained by molding and is in the form of a sheet, from one surface of which sheet the capsules of the devices protrude.

The sheet is designed so that each device can be detached simply by pressing on the head of the capsules of the devices.

For this purpose, each capsule is linked to the sheet via a weakened and separable region which surrounds it and which is obtained by reducing the thickness of the sheet around the capsule and by the presence of cuts made in the reduced thickness so that the capsule is linked to the sheet only by bridges of material which are capable of being broken by pressing manually or by using any suitable tool.

Advantageously, each weakened and separable region which surrounds a capsule is itself surrounded by a circular reinforcing rib which prevents premature tearing of said weakened and separable regions during demolding.

According to the invention, the capsules of the suppport advantageously comprise a body of substantially cylindrical or frustoconical shape, the inner and outer faces of which may have, in cross section, independently of each other, a circular or polygonal shape, which body is closed by a head.

In general, the conformation of the inner face of the body of the capsules is matched to the shape of the protruding element that these capsules are intended to cover. Consequently, the body of the capsules may perfectly well have an inner face of cross section the same shape as that of the protruding element, while having an outer face of different cross section.

According to a first advantageous embodiment of the invention, the body of the capsules are a cylinder or a truncated cone, the inner and outer faces of which have a circular cross section.

Advantageously, the head of the capsules is a spherical cap.

According to the invention, the mastic contained in the capsules is, when it is in the frozen state, preferably in the form of a nut which adheres to the bottom of the capsules, said nut being approximately coaxial with the latter. This is because such an arrangement has the advantage of allowing the mastic, once the device has been applied to the protruding element, to flow over the entire outer surface of this element in a uniform manner.

The support according to the invention is able to allow any mastic sealant whatsoever to be applied. Consequently, the mastic present in the capsules may be chosen from the very many mastics which are offered for sealing against fluids, whether these be liquids or gases, it being understood that this choice will generally depend on the type of fluids against which the mastic must seal and, consequently, by the properties of resistance to the effects of these fluids that it must have.

Thus, for example, if the capsules of the support according to the invention are intended to be used to form a seal at the linking elements of a fuel tank or the fuselage of an airplane, the mastic present in the capsules is advantageously a polysulfide-based mastic, such as those sold by Le Joint Francais under the brand names PR 10770, PR 1750, etc., or, as a variant, a polythioether-based mastic of the PR 1828 type (also from Le Joint Francais) or one based on another crosslinkable polymer.

According to the invention, the capsules and the base of the support are made of a material based on one or more elastomers, the latter advantageously being chosen according to three criteria, namely:

having, with respect to the mastic sealant, compatibility suitable for obtaining satisfactory adhesion between this mastic and the capsules;

exhibiting, with regard to the fluids against which the seal is required, resistance properties similar to those of the mastic so as to prevent the capsules from degrading on contact with these fluids and so that the products of this degradation do not contaminate the latter, and/or possessing sufficient resistance to the effects of electromagnetic phenomena (lightning) by the choice of the material and the design of the capsules; and being crosslinkable in a sufficiently short time so that manufacture on an industrial scale of the support according to the invention can be carried out at a satisfactory rate. Within the context of the present invention, a crosslinking time of less than or equal to 10 minutes is generally considered as acceptable.

In practice, the first two criteria will usually be met by using, for manufacturing the capsules, the same elastomer or elastomers as those used in the composition of the mastic. Thus, for example, if the mastic sealant intended to be applied by means of the support according to the invention is a mastic based on a polysulfide, the capsules are advantageously made from an elastomer composition also comprising a polysulfide.

The use of such a support for devices for applying a mastic sealant according to the invention has many advantages and especially those of allowing:

rapid manufacture of a large number of identical sealing devices linked to a common support but easily detachable therefrom for the purpose of using them;

ease of storing the devices, especially by superposing several supports, and of using them, since they are easier to grip than if they had been placed loosely in a container, and several capsules linked to the same support are available to the user; and complete, uniform and reproducible coating, in a few simple movements rapidly executed, with this mastic, of elements protruding from a surface and the portion of this surface which surrounds these elements.

The subject of the present invention is also the use of a support for storing, transporting and using devices for applying a mastic sealant, such as those defined above, to form a fluid-tight seal at rigid linking elements of the rivet, bolt or similar type.

This use is of most particular benefit for the manufacture of fluid-tight structures such as fuel tanks, whether in the aeronautical, naval, automobile or other industry.

The subject of the present invention is also the use of a support for storing, transporting and using devices for applying a mastic sealant, such as those defined above, for protecting the protruding elements of structures from electromagnetic effects such as lightning.

Apart from the preceding embodiments, the invention also includes other embodiments which will emerge from the rest of the following description, given by way of illustration of this invention and with reference to the appended drawings in which.

Figure 1:
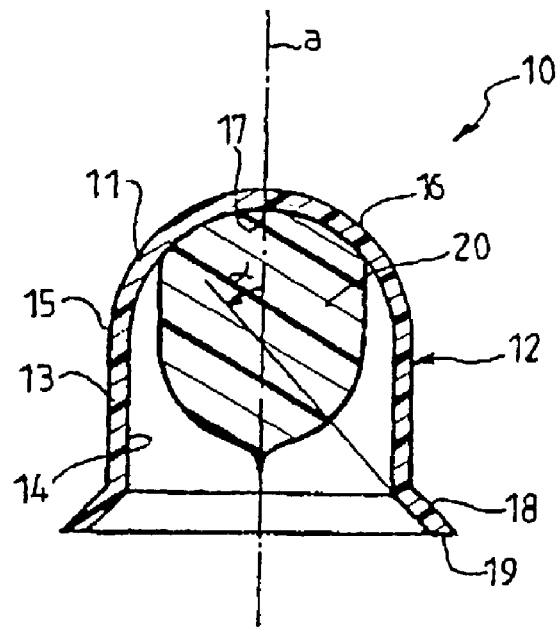
FIG. 1 is a schematic longitudinal sectional view of a device for applying a mastic sealant.

Referring firstly to FIG. 1, this shows schematically a device 10 for applying a mastic sealant, designed to form a seal at a linking element such as a rivet or a bolt. In this figure, this device is shown as it would be once it has been detached from a support according to the invention and in the position in which it is intended to be applied to the protruding portion of the linking element. This position is the reverse of that in which said device is preferably stored and transported and in which above all it is defrosted for the purpose of using it.

As may be seen in FIG. 1, the device 10 comprises a capsule 11 which itself comprises a body 12 of frustoconical shape of axis a, which is bounded by a wall 13 and the inner 14 and outer 15 faces of which have, in cross section, a circular shape.

The body 12 of the capsule 11 is closed, at its end which has the smallest mean diameter, by a spherical cap 16, having the same axis as the body and the inner face of which forms, in its central portion, the bottom 17 of the capsule.

At the opening of the body 12 of the capsule 11—which corresponds to the end of this body having the highest mean diameter—its wall 13 is extended, over the entire perimeter of this end, by a rim 18 of annular shape which extends radially outward from said body 12 in a direction making an angle α of approximately 45° with the axis a.

As may be clearly seen in the FIG. 1, the rim 18 terminates, at its opposite end to that joined to the wall 13 of the body of the capsule, and over the entire perimeter of this end, in a bevel so that the free edge 19 of this rim lies in a plane perpendicular to the axis a.

The thickness of the rim 18 is the same as the thickness that the wall 13 of the body 12 of the capsule 11 has at the opening of this body. However, the thickness of this wall 13 gradually increases toward the spherical cap 16, to be the maximum at the central point of the latter, that is to say the point through which the axis a passes.

Also as may be seen in FIG. 1, the capsule 11 is partially filled with a mastic 20. This mastic is in the form of a nut which adheres, when the mastic is in the frozen state, to the bottom 17 of the capsule 11 and which occupies a volume approximately half of the internal volume of the latter.

Figure 4:
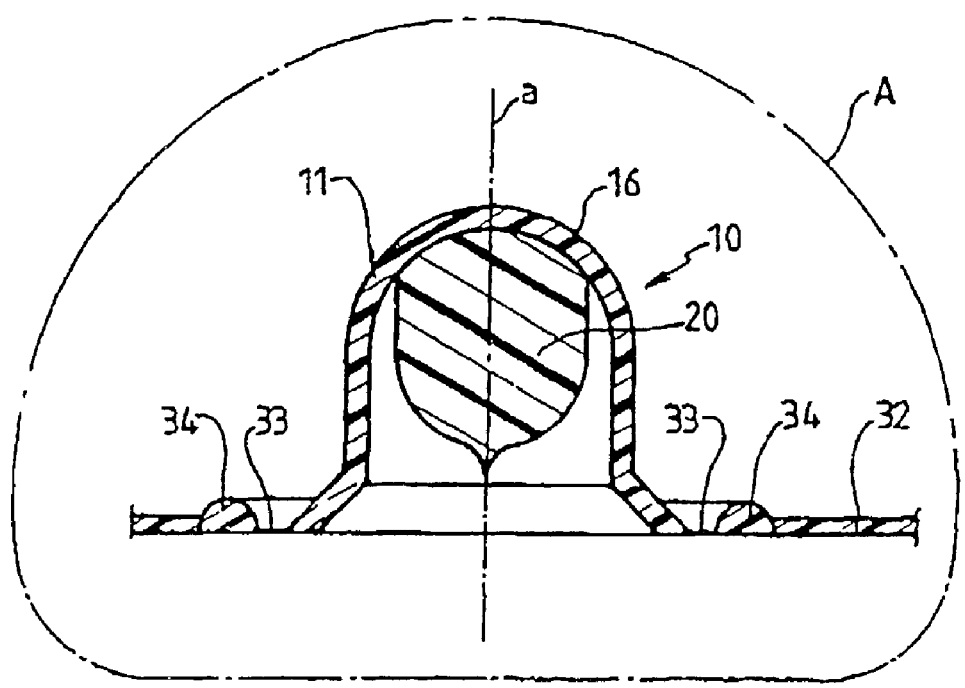
FIG. 4 is a partial schematic view on a larger scale of FIG. 3.
Figure 2:
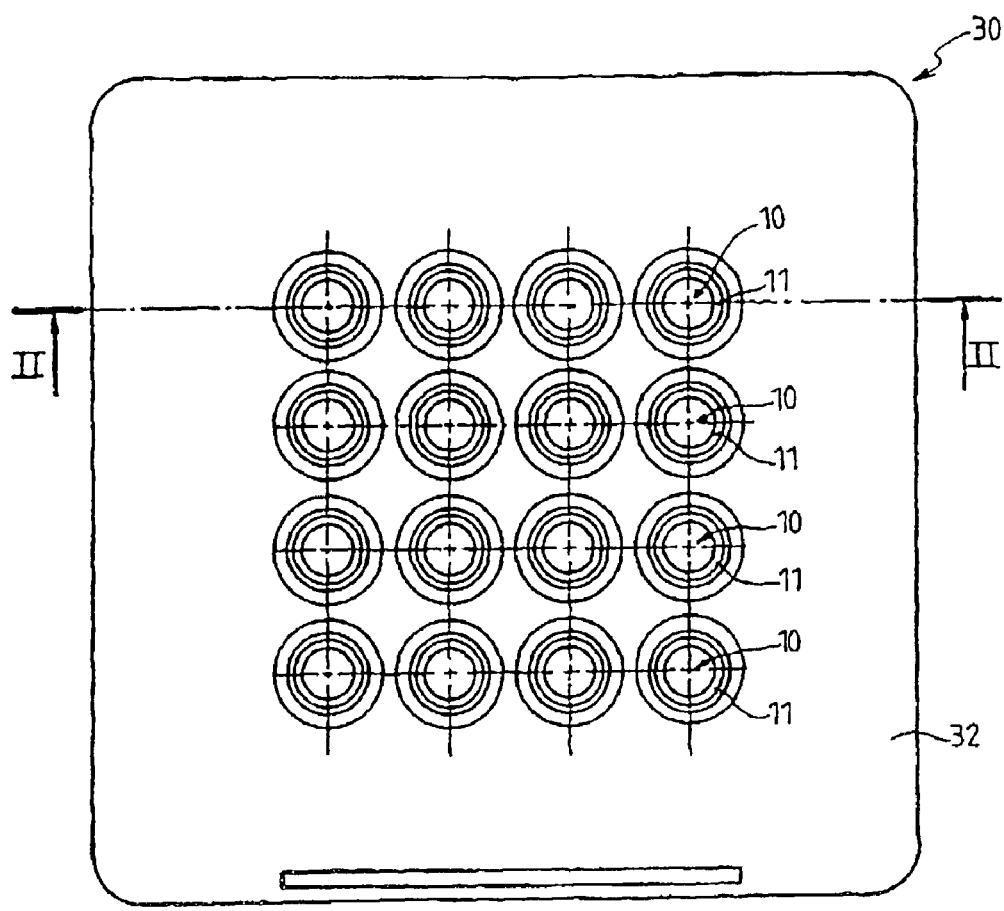
FIG. 2 is a schematic plan view of a support for storing, transporting and using devices as in FIG. 1.
Figure 3:
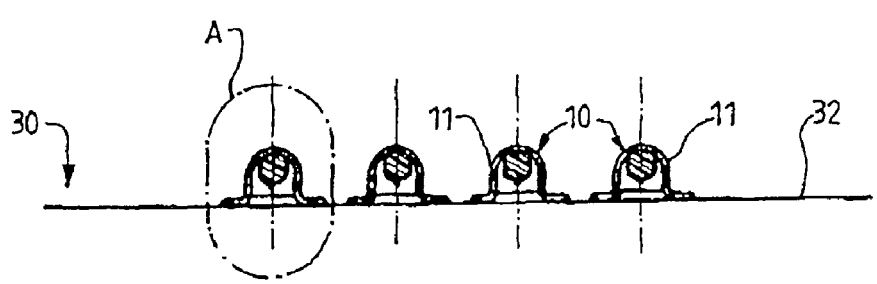
FIG. 3 is a schematic cross-sectional view on the line II—II of the support in FIG. 2.

Referring now to FIGS. 2 to 4, these illustrate schematically a support 30 forming the subject of the present invention which is especially designed to make it easier to store, transport and use devices 10 for applying a mastic sealant in accordance with that described in relation to FIG. 1. In these figures, the support 30 is shown as it is at the end of its manufacture up to the point when it is used. Moreover, in FIGS. 3 and 4, the support 30 is shown in a position which corresponds to the position of applying the devices 10 to the protruding portions of linking elements and which, here again, is the reverse of the position in which the support 30 is itself stored, transported and used.

As FIG. 2 shows, the support 30 is in the form of an array comprising several devices 10 which are arranged in rows and columns. In the embodiment shown in FIG. 2, the devices 10 are sixteen in number and are distributed in four rows and four columns each comprising four devices 10.

The array is made as one piece by molding and comprises a sheet 32, typically having a thickness of around 0.5 mm, and the capsules 11 for the devices protrude from a surface of this sheet.

The flexible sheet is designed so that each device 10 can be detached by simply pressing on the spherical cap 16 of the capsules 11 of the devices 10. For this purpose, each capsule 11 is linked to the sheet 32 via a weakened and separable region 33 which surrounds the capsule.

As may be seen in FIG. 4, this region 33 is obtained by reducing the thickness of the sheet 32 around the capsules 11 of the devices 10 and by the presence of cuts in this thus reduced thickness, so that these capsules are linked to the sheet 32 only via bridges of material which may be easily broken simply by pressing on the spherical cap 16 of said capsules.

As also shown in FIG. 4, each weakened and separable region 33 which surrounds a capsule 11 is itself surrounded by a circular reinforcing rib 34 which prevents premature tearing of said weakened and separable regions during demolding of the support.

As an example, the support and the capsules may be produced by means of a process comprising the following steps:
 the material intended to be used for producing the support and the capsules is prepared;
 a mold is filled with said material, this mold comprising a hollowed impression of matched shape in order to be able to produce, in one go, the support and the linked capsules in one piece with the support, these being linked by means of thin bridges of material forming weakened and separable regions;
 the mold is heated so that the crosslinking of the elastomer material takes place inside the mold;
 the support and its capsules are demolded once the material has cured;
 the bottom of each capsule is filled with the chosen amount of mastic; and
 the support and its capsules thus filled with mastic are frozen in order to prevent the latter from curing and to allow it to thus maintain all the physical characteristics of a fresh mastic.

As an example, the material (a masterbatch) used to make the support and the capsules may be based on a polysulfide rubber mixed with inert fillers, such as carbon black, and with a crosslinking system, preferably one based on sulfur and including, for example, crosslinking promoters such as stearic acid and zinc oxide, a sulfur donor accelerator, such as tetramethylthiuram disulfide or dipentamethylthiuram tetrasulfide, and a retarder.

The proportions of the various constituents of the masterbatch are given by way of indication in parts by weight:
 polysulfide rubber: 50 to 100;
 carbon black: 30 to 60;
 stearic acid: less than 10;
 zinc oxide: less than 10;
 accelerator: less than 10; and
 retarder: less than 10.

However, it should of course be understood that these examples are given merely as an illustration of the subject matter of the invention—they do not constitute in any way a limitation thereof.

Thus, each weakened and separable region may be surrounded by a circular reinforcing rib in order to prevent the capsules from becoming detached during the molding. The impression of the mold is therefore tailored accordingly so as to form these ribs.

Alternatively, the separable regions may be formed outside the mold, after the support and the capsules have been molded, for example by partial cutting around the capsules using a punching die. It is then unnecessary to provide a circular reinforcing rib.

The invention claimed is:

1. An assembly comprising a base and a plurality of devices for applying a mastic sealant to a protruding element on a surface, the assembly comprising a plurality of devices and a substantially planar base,
 wherein each device i) is detachable from the base, ii) comprises a capsule that can completely cover the protruding element and iii) contains a predetermined amount of the mastic sealant in a frozen state,
 wherein the capsule and the base form a one-piece structure and are made of the same crosslinked elastomer material,
 wherein the base is molded in the form of a sheet and the capsules protrude from one surface of the sheet,
 wherein each capsule is attached to the sheet by a weakened and separable region which surrounds the capsule, wherein the region comprises a reduced thickness of the sheet and cuts, and wherein the capsule is attached to the sheet only by bridges of material, which are capable of being broken by pressing manually or using a suitable tool,
 and wherein the weakened and separable region which surrounds the capsule is surrounded by a circular reinforcing rib which prevents premature tearing of the weakened and separable regions during demolding.

2. The assembly of claim 1, wherein each capsule comprises: a body having a substantially cylindrical shape or a substantially frustoconical shape, wherein the body comprises
 (A) an inner face and an outer face, which have, in cross section, independently of each other, a circular shape or a polygonal shape, and
 (B) a head, wherein the body is closed by the head.

3. The assembly of claim 2, wherein the conformation of the inner face of the body of the capsule is matched to a shape of the protruding element that the capsule covers.

4. The assembly of claim 2, wherein the head of the capsule is spherical.

5. The assembly of claim 1, wherein each capsule comprises: a body comprising a cylinder or a truncated cone, and an inner face and an outer face of the body having a circular cross section.

6. The assembly of claim 1, wherein the mastic sealant contained in the capsules is, when it is in the frozen state, in the form of a nut, which adheres to a bottom of the capsule and is disposed approximately coaxially with the capsule.

7. The assembly of claim 1, wherein the mastic is a polysulfide-based mastic.

8. The assembly of claim 1, wherein the mastic comprises a crosslinkable polymer.

9. The assembly of claim 1, wherein the capsules and the base are made of a material comprising at least one elastomer.

10. A method for forming a fluid-tight seal using an assembly comprising a base and a plurality of devices for applying a mastic sealant to a protruding element on a surface, the assembly comprising a plurality of devices and a substantially planar base, wherein each device i) is detachable from the base, ii) comprises a capsule that can completely cover the protruding element and iii) contains a predetermined amount of the mastic sealant in a frozen state,
   wherein the capsule and the base form a one-piece structure and are made of the same cross-linked material,
   wherein the base is molded in the form of a sheet and the capsules protrude from one surface of the sheet,
   wherein each capsule is attached to the sheet by a weakened and separable region which surrounds the capsule, wherein the region comprises a reduced thickness of the sheet and cuts, and wherein the capsule is attached to the sheet only by bridges of material, which are capable of being broken by pressing manually or using a suitable tool,
   wherein the weakened and separable region which surrounds the capsule is surrounded by a circular reinforcing rib which prevents premature tearing of the weakened and separable regions during demolding,
   the method of forming the seal comprising the steps of:
      providing a plurality of the devices on a substantially planar base; and
      applying a mastic sealant to the protruding element with the device to form a fluid-tight seal.

11. The method of claim 10, wherein the step of applying the mastic sealant further comprises applying the mastic sealant to a rigid linking element.

12. The method of claim 11, wherein the rigid linking element is a rivet or a bolt.

13. The method of claim 10, wherein the step of applying the mastic sealant further comprises forming a fluid-tight seal to manufacture at least one of an aeronautical, naval, and automobile structure.

14. The method of claim 13, wherein the at least one of an aeronautical, naval, and automobile structure is a fuel tank.

15. The method of claim 10, wherein the step of applying the mastic sealant further comprises forming a fluid-tight seal to protect the protruding element from electromagnetic effects.

16. The method of claim 15, wherein the electromagnetic effect is lightning.

* * * * *